United States Patent

Biferno

[11] Patent Number: 5,825,305
[45] Date of Patent: Oct. 20, 1998

[54] CARGO LOADING ALIGNMENT DEVICE

[75] Inventor: Michael A. Biferno, Arcadia, Calif.

[73] Assignee: McDonnell Douglas Corporation, Huntington Beach, Calif.

[21] Appl. No.: 434,624

[22] Filed: May 4, 1995

[51] Int. Cl.$^6$ ............................................. G08B 21/00
[52] U.S. Cl. .................................. 340/958; 340/932.2
[58] Field of Search .............................. 340/932.2, 958, 340/431, 961; 244/135 A, 135 R, 161, 114 R

[56] References Cited

U.S. PATENT DOCUMENTS

| | | | |
|---|---|---|---|
| 2,818,553 | 12/1957 | Jaffe | 340/932.2 |
| 3,662,332 | 5/1972 | Zechnowitz et al. | 340/958 |
| 3,674,226 | 7/1972 | Wasson | 340/958 |
| 3,690,599 | 9/1972 | Hager | 340/958 |
| 3,767,309 | 10/1973 | Brown et al. | 340/958 |
| 3,821,697 | 6/1974 | Brown | 340/958 |
| 4,015,235 | 3/1977 | Demaine et al. | 340/958 |
| 4,665,378 | 5/1987 | Heckethorn | 340/958 |
| 4,763,125 | 8/1988 | Newman et al. | 340/958 |
| 4,843,373 | 6/1989 | Trickle et al. | 340/932.2 |
| 5,285,205 | 2/1994 | White | 340/958 |

*Primary Examiner*—Brent A. Swarthout
*Attorney, Agent, or Firm*—Bell Seltzer Intellectual Property Group of Alston & Bird, LLP

[57] ABSTRACT

A cargo loading alignment device is integrally mounted to a movable cargo transport. The transport has a cargo door opening and loading ramp with a longitudinal centerline, and the alignment device is installed near the cargo door opening. The device includes at least one light source for projecting at least one beam of light onto the loading surface, for visually indicating a desired alignment of a delivery vehicle for transferring cargo to and from the transport. A preferred embodiment of the device includes a light source for projecting a first and a second planer beam of light perpendicularly to the centerline of the loading ramp; and a third planer beam of light extending parallel or coinciding with the centerline of the loading ramp. Other embodiments include pencil beams of light rather than planer beams to indicate an alignment reference line to facilitate the alignment of a delivery vehicle to a cargo transport; and further embodiments utilize the invention as a safety device to visually indicate caution "or stay out" areas on the ground below the transport.

8 Claims, 2 Drawing Sheets

CARGO LOADING ALIGNMENT DEVICE

BACKGROUND OF THE INVENTION

The invention relates to a cargo loading alignment device; and more particularly to an alignment device which is integral with a movable cargo transport to facilitate the alignment of delivery vehicles for the transfer of cargo to and from the moveable cargo transport at loading locations that are unlighted, dirt, or uneven surfaced (austere) fields.

Stationary cargo storage warehouses usually include a fixed loading dock or ramp. This ramp is typically well lighted with visual indicators fixed to the ground surface adjacently to the warehouse to facilitate the alignment of delivery vehicles with the ramp. Such alignment indicators typically include stripes or grids painted on the ground surface which are parallel and perpendicular to the loading ramp and provide adequate reference for the driver of the delivery vehicle to properly align the truck bed or trailer of his vehicle with the loading ramp.

Various other devices have been utilized by the prior art to facilitate the alignment and positioning of a vehicle relative to a fixed parking or loading location. One such trailer back-up system is illustrated in U.S. Pat. No. 3,893,068 in which a pair of reflective markers are installed at the rear corners of the ground surface of the parking space. The markers include light sources which illuminate the reflective front surface of the markers and provide a light beam between the markers to indicate the end of the parking space for night time alignment of a trailer within the fixed space.

More complex electronic alignment and positioning systems of the prior art are known which incorporate various transmitters, receivers, sensors and computer systems, as illustrated in U.S. Pat. Nos. 3,360,775; 4,938,495; 5,004,997; and 5,142,658.

A problem is presented for an alignment system for a loading ramp of a movable cargo vessel, such as an air transport, which is loaded and unloaded at various positions on various austere airfields. These airfields do not have alignment patterns on the ground surface for such various positions of the loading ramp of the transport, or alignment devices which can be readily laid-out and installed on the surface to facilitate the alignment of delivery vehicles with the loading ramp of the air transport. This problem is not addressed or solved by the known prior art systems.

This problem is particularly acute during hours of darkness where visibility and reference to ground objects is more limited. This problem may be further presented on military airfields which may have irregular expedient surfaces, and camouflaged or otherwise limited surface markings.

It is an object of the present invention to provide a cargo loading alignment device for a movable cargo transport which projects a visible reference line on the loading area surface to facilitate alignment of delivery vehicle.

It is another object to provide an alignment device which is simple and reliable in operation.

It is another object to provide an alignment device which self contained and integral with the transport.

SUMMARY OF THE INVENTION

The foregoing objects are accomplished by the present invention in which a cargo loading alignment device is integrally mounted to a movable cargo transport. The transport has a cargo door opening and loading ramp with a longitudinal centerline, and the alignment device is installed near the cargo door opening. The device includes at least one light source for projecting at least one beam of light onto the runway, for visually indicating a desired alignment of a delivery vehicle for transferring cargo to and from the transport. A preferred embodiment of the device includes a light source for projecting a first planer beam of light perpendicularly to the centerline of the ramp and generally vertically downwardly to the ground surface at a desired distance from the end of the ramp. The device further includes an additional light source for projecting another planer beam of light perpendicularly to the centerline of the ramp, extending downwardly to the ground surface, and at a desired distance greater than the distance of the first beam of light from the end of the ramp. The device further includes an additional light source for projecting a third planer beam of light vertically downwardly and extending parallel with the centerline of the ramp. The first and second beams of light thus provide an indication of a minimum and a maximum distance alignment path for the vehicle, with the third beam of light precisely indicating a centerline position of the loading ramp of the transport relative to the vehicle cargo bed.

BRIEF DESCRIPTION OF THE DRAWING

While the novel features of the invention are set forth in the appended claims, the invention will be better understood along with other features thereof from the following detailed description taken in conjunction with the drawings in which:

DETAILED DESCRIPTION OF THE INVENTION

Figure 1:
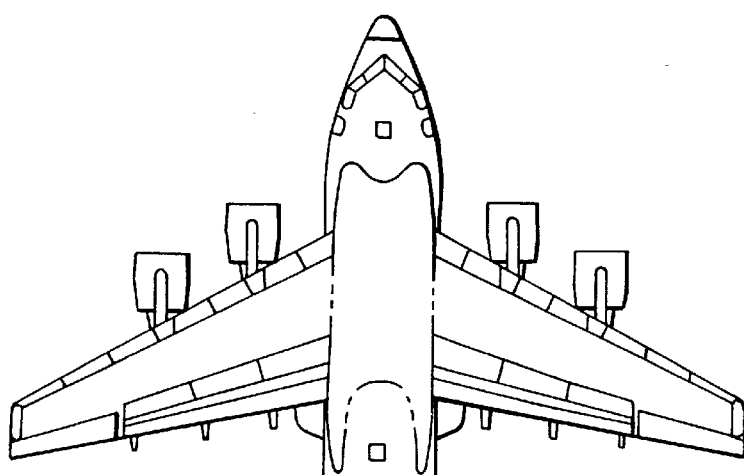
FIG. 1 is an aerial plan view of an air cargo transport with a delivery vehicle properly aligned at the rear loading ramp.

Referring first to FIG. 1, there is illustrated an air cargo transport 10 having a rear cargo door with a loading ramp 12 with the proximal end 14 extended and lowered in position to transfer cargo. The longitudinal centerline of the ramp is indicated by reference line 16'. A reference line 18 is shown which is perpendicularly oriented to the centerline of the ramp. A delivery vehicle 20 is shown with a cargo bed 22 and cargo trailer 24 properly aligned perpendicularly to the loading ramp to transfer cargo to and from the transport.

The center reference line 16 and perpendicular reference line 18 are of important in the proper alignment of the delivery vehicle. Proper alignment is particularly important because air cargo handling systems are increasingly being automated for palletized cargo distributing with lessor manpower to maneuver the cargo. A palletized cargo handling system is utilized to automatically transfer the cargo to and from the delivery vehicle to the loading ramp; then further to distribute the cargo from the loading ramp to the interior cargo bay of the transport. Such automatic cargo handling systems typically transfer the cargo on conveyers which operate precisely parallel to the longitudinal centerline of the transport, and the loading ramp and alignment of the delivery vehicle with the automated handling system is critical to efficiently transfer the cargo.

The delivery vehicle 20, shown in FIG. 1, is side loaded and thus approaches the transport perpendicularly to the loading ramp along reference line 18 and at a predetermined distance from the proximal end 14 of the ramp, for proper alignment. The vehicle is halted at a first location to transfer cargo from the desired area of the cargo bed 22 of the vehicle; and when properly aligned, the vehicle is merely pulled forward and relocated to sequential positions to efficiently transfer cargo from other areas along the cargo bed and cargo trailer 24 of the vehicle.

Other delivery vehicles may incorporate a rear loaded cargo bed or trailer (not shown), and these vehicles can be properly oriented by backing the vehicle in position along the center reference line 16 of the loading ramp. Orientation of such vehicles may be facilitated by a reference line 26 which is parallel to the center reference line, and which is visible when looking rearwardly from the driver side of the vehicle. The perpendicular reference line 18 is important to indicate the end of the loading ramp to facilitate the proper position of the vehicle.

From the foregoing discussion, it is recognized that at least one reference line visible to a driver and indicating the direction of proper alignment of the vehicle relative to a loading ramp (typically perpendicular to the loading ramp, or parallel to the loading ramp) will greatly facilitate the driver's positioning of the delivery vehicle.

Figure 2:
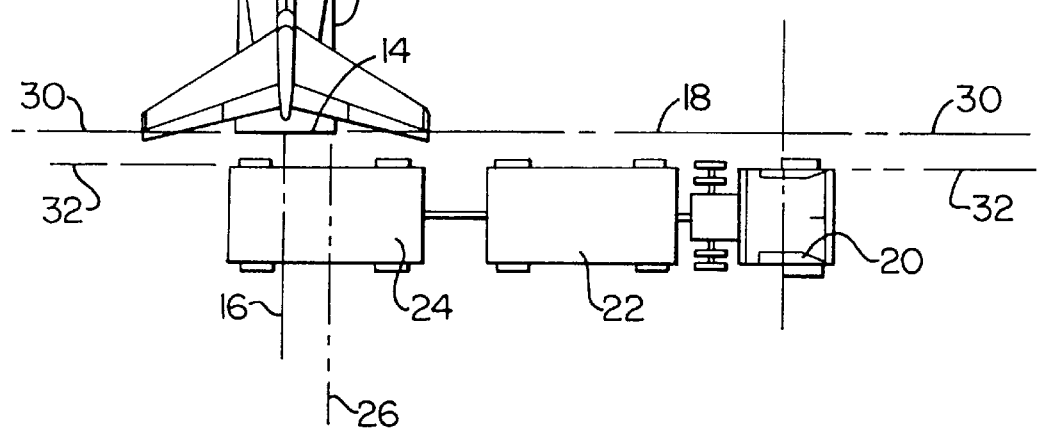
FIG. 2 is a left side elevational view of one embodiment of the cargo loading alignment device of the present invention.
Figure 2:
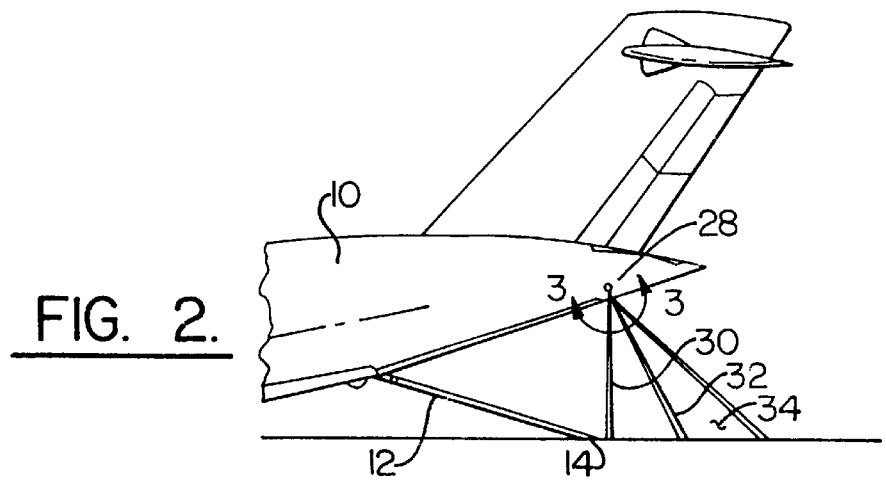
Figure 4:
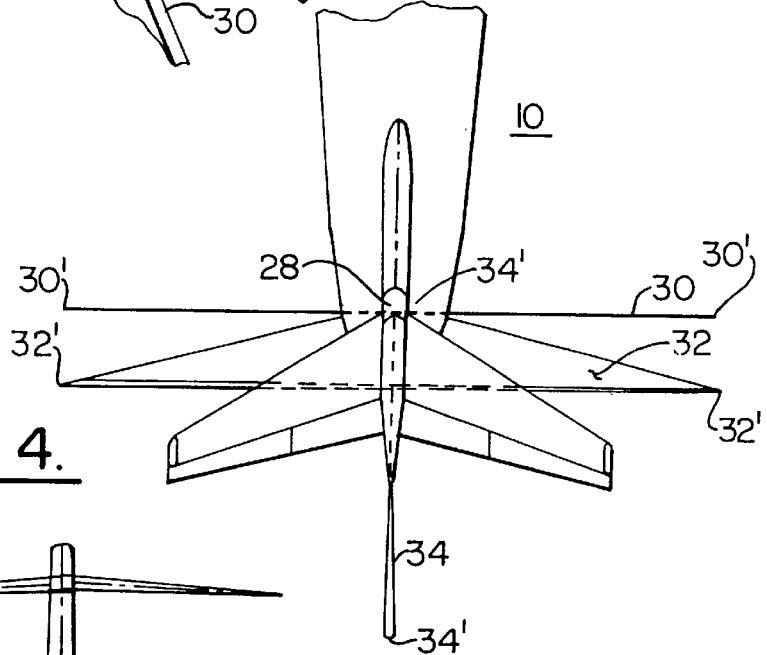
FIG. 4 is a top plan view illustrating the alignment beams of one embodiment of the present invention.
Figure 5:
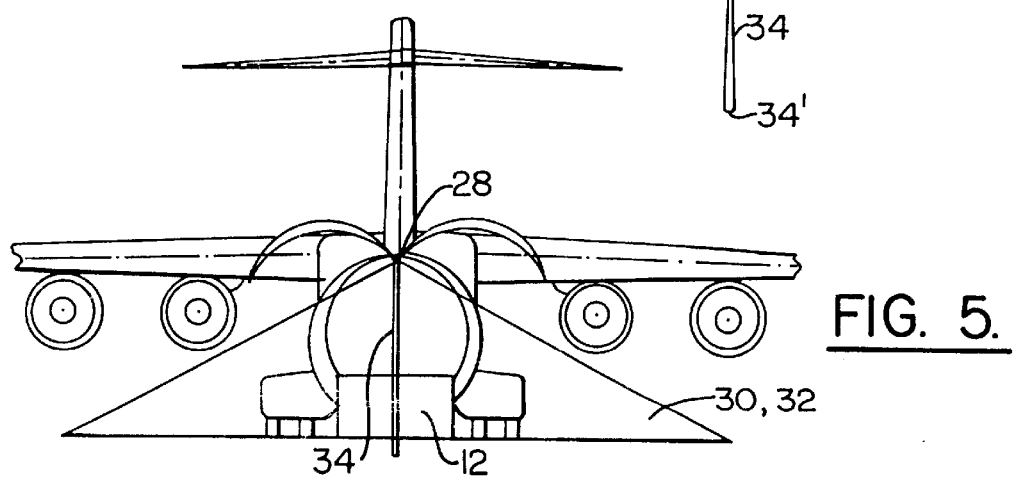
FIG. 5 is a rear elevational view of the alignment beams of one embodiment of the present invention.

An example of a cargo loading alignment device of the present invention is shown in FIGS. 2, 4 and 5 and is provided by a device that is integrally mounted near the cargo door opening near the tail of the transport. The device includes at least one light source for projecting at least one beam of light onto the runway, as an alignment orienting reference line.

A preferred embodiment includes a light source 28 which is positioned near the tail of the transport generally vertically above a position corresponding to a proximal end 14 of the loading ramp 12. The light source projects a thin collimated first planer beam of light 30 perpendicularly to the centerline of the loading ramp and generally vertically downwardly to the ground surface of the runway at a desired distance (about one to three feet) from the proximal end of the ramp. The light source further projects a second planer beam of light 32 perpendicularly to the centerline (and parallel to the first beam) and extending downwardly to the ground surface at a distance greater than the distance of the first planer beam of light (an additional one to three feet) from the proximal end of the ramp. The first beam of light and the second beam of light thus provide an alignment path indicating a minimum and maximum desired distance from the end ramp, to facilitate a driver of a delivery vehicle to properly align his vehicle without further assistance. The light source preferably further projects a third planer beam of light 34 generally vertically downwardly and extending parallel with the centerline of the loading ramp, and onto the cargo vehicle and the ground surface. This third beam of light provides a precise reference line of the position of the cargo bed or cargo trailer of the vehicle relative to the centerline of the loading ramp, to further assist the driver in the precise positioning of the vehicle along the alignment path. This third beam of light can indicate the actual centerline (as shown) or can be spaced parallel (as shown by reference line 26 of FIG. 1) to provide the desired visual reference line to the driver.

In the foregoing preferred embodiment of the invention, the first beam of light 30 is green in color and is projected to display a line, about four inches in width, a distance of about twenty feet along the surface on each side of the centerline 16. The beam of light 32 is similarly projected (although the angled beams are usually somewhat wider) preferably red in color; whereby, if the driver is aligned along the projected green light 30 and can see none of the projected red light 32, he knows that he is properly aligned. The longitudinal beam of light 34 is also projected about twenty feet from the end ramp and is also green in color. The colors of the projected light beams can alternatively be all white, or all one or a combination of different colors. The colored beams tend to be more visible during daylight cargo transfer operations, while white beams tend to be stronger and more visible during night operations.

FIGS. 4 and 5 illustrate an example of the collimated thin planer beams of light 30, 32, and 34 as they are projected from the light source 28 downwardly to the ground surface of the loading area.

A variety of alternative embodiments are possible which provide different arrangements of light beams, to include a single longitudinally parallel beam, a single perpendicular beam or a combination of parallel, perpendicular, and even angular beams to provide a desired visible alignment pattern on the ground.

Figure 3:
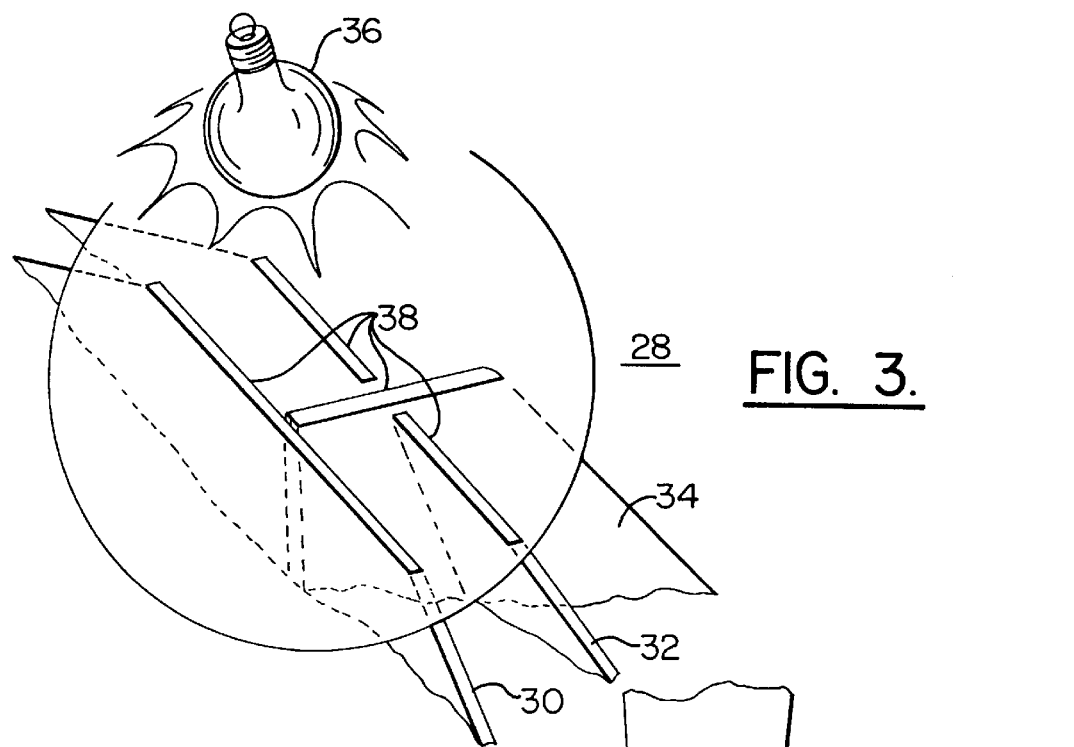
FIG. 3 is an enlarged (cut-away) top perspective view of the area generally inscribed by 3—3 in FIG. 2 of one embodiment of the light source of the device of the present invention.

Referring now to FIG. 3, an example of the light source 28 is illustrated which includes at least one high intensity illuminating source 36 and a collimator system 38 which is shown as an arrangement of optical lenses covering slits, which are combined to project the respective thin planer beams of light 30, 32 and 34. The lenses can be clear, white or colored respectively to provided the desired beams of light, as previously discussed. Alternatively, the light source can include multiple (clear, white, or colored) illuminating sources 36 for different daylight and nightime operations. The collimator system can further be compartmentized for the projection of specific or selected illumination of a desired beam or combination of beams of light.

Further examples of the light source include a variety of well known incandescent, florescent, sodium, mercury vapor, or laser illumination sources 36; and further examples of the collimator system 38 include a variety of well known combinations of optical lenses and reflectors for focusing and collimating the light from the illumination source into the desired projected pattern.

In alternate embodiments of the present invention, it may be desirable to provide a light source for projecting focused pencil beams in a series of points rather than planer beams to establish a desired alignment reference line. Such an embodiment includes a light source (36) comprising at least one laser device for projecting at least two beams of light generally downwardly to the ground surface at a desired distance from the proximal end of the ramp and which establishes points of a reference line oriented perpendicularly to the centerline of the loading ramp. A similar type of light source is utilized for projecting points of a reference line oriented parallel with the centerline of the ramp. Such lines created by a series of points are illustrated in FIG. 4, respectively, as 30', 32' and 34'; and correspond to the reference lines established by the planer beams of light (30, 32, and 34), as previously discussed.

The various embodiments of the cargo loading alignment devices of the present invention clearly provide an alignment device which projects a visible reference line on the loading area surface to facilitate alignment of a delivery vehicle. The device is integral with the cargo transport and thus always readily available, and is independent of both the surface location of the transport and conditions of the loading area. The device functions with the mere flip of a switch and requires no routine adjustment or maintenance, and is thus simple and reliable in operation, Another embodiment of the projection system of the present invention provides a safety lighting device for visually indicating "caution areas" on the ground surface of the parked transport. Examples are "stay out" areas on the ground around the intakes and exhausts of the engines of the aircraft. Ground service personnel can readily see and avoid such caution areas. The safety device is as generally shown in FIG. 4 including at least one and preferably an array of beams of light projected from a light source on the aircraft, and focused to identify the caution areas on the ground. Such light beams are typically red to indicate stop, hazard, or caution areas.

Although the cargo loading alignment device and safety device of the present invention is preferably integrally installed on the cargo transport, (projecting beams of light from the exterior fusalage or the opening of the cargo door); the device may be packaged and utilized as an attachable or adjacent accessory for use with the transport. Such an accessory is considered to be fully included within the scope of the present invention.

While specific embodiments and examples of the present invention have been illustrated and described herein, it is realized that modifications and changes will occur to those skilled in the art. It is therefore to be understood that the appended claims are intended to cover all such modifications and changes as fall within the spirit and scope of the invention.

I claim:

1. A cargo loading alignment device, for a movable cargo transport having a cargo door opening and loading ramp with a longitudinal centerline, the cargo loading alignment device being integrally mountable near the cargo door opening for visually indicating on a support surface, which supports the movable cargo transport, a desired alignment of a delivery vehicle for transferring cargo to and from the movable cargo transport, the cargo loading alignment device comprising:

a power source; and a light source connected to the power source and adapted to be attached to the movable cargo transport, the light source further being adapted for projecting a first planar beam of light generally vertically downwardly onto the support surface, the first planar beam of light forming a line on the support surface that is generally perpendicularly oriented to the longitudinal centerline of the loading ramp and disposed on the support surface at a desired distance from a proximal end of the ramp.

2. The alignment device as recited in claim 1, further comprising an additional light source for projecting another planar beam of light generally vertically downwardly onto the support surface, the other planar beam of light being projected onto the support surface in the form of a second line on the support surface that is generally parallel with the longitudinal centerline of the loading ramp.

3. The alignment device as recited in claim 1, further comprising an additional light source for projecting another planar beam of light onto the support surface in the form of a second line on the support surface that is generally perpendicularly oriented to the longitudinal centerline of the loading ramp, the second line being disposed on the support surface at a desired distance greater than the distance of the first beam of light from the proximal end of the ramp.

4. The alignment device as recited in claim 3, further comprising an additional light source for projecting a third planar beam of light generally vertically downwardly onto the support surface to form a third line on the support surface, the third line extending parallel with the longitudinal centerline of the loading ramp.

5. A cargo loading alignment device, for a movable cargo transport having a cargo door opening and loading ramp with a longitudinal centerline, the cargo loading alignment device being integrally mountable near the cargo door opening for visually indicating on a support surface, which supports the movable cargo transport, a desired alignment of a delivery vehicle for transferring cargo to and from the movable cargo transport, the cargo loading alignment device comprising:

a support structure adapted to be attached to the movable cargo transport; and a light source connected to the support structure and being adapted for projecting at least two beams of light generally downwardly onto the support surface at two respective desired distances from a proximal end of the ramp, the two beams of light establishing two points of a reference line on the support surface, the line established by the two points being oriented on the support surface perpendicularly to the longitudinal centerline of the loading ramp.

6. The cargo alignment device as recited in claim 5, wherein the light source comprises at least one laser device for projecting a plurality of focused spot beams of light along the reference line on the support surface to establish the reference line.

7. A cargo loading alignment device, for a movable cargo transport having a cargo door opening and loading ramp with a longitudinal centerline, the cargo loading alignment device being integrally mountable near the cargo door opening for visually indicating on a support surface, which supports the movable cargo transport, a desired alignment of a delivery vehicle for transferring cargo to and from the movable cargo transport, the cargo loading alignment device comprising:

a power source; and a light source adapted to be connected to the power source and attached to the movable cargo transport, the light source further being adapted for projecting at least two beams of light generally downwardly onto the support surface to thereby form first and second lines on the support surface, the first and second lines being formed on the support surface at first and second distances, respectively, from a proximal end of the loading ramp and establishing first and second reference lines which are both oriented perpendicularly to the longitudinal centerline of the loading ramp.

8. A cargo loading alignment device for a moveable cargo transport adapted to be positioned at any of a plurality of locations on a support surface, the cargo loading alignment device having a light source adapted for projecting three reference marks onto the support surface, the light source being adapted for projecting the three reference marks onto the support surface regardless of where the moveable cargo transport is positioned on the support surface, the projection of the three reference marks onto the support surface facilitating alignment of a delivery vehicle with the moveable cargo transport regardless of where the moveable cargo transport is parked on the support surface, wherein the movable cargo transport includes a loading ramp having a centerline, and wherein the three reference marks comprise:

first and second generally parallel visible reference lines disposed on the support surface and adapted for forming an alignment path on the support surface that is generally perpendicular to the centerline of the loading ramp, the first and second generally parallel visible reference lines indicating a minimum and a maximum desired parking distance of the delivery vehicle from the loading ramp; and a third visible reference line extending on the support surface generally parallel to the centerline of the loading ramp and intersecting the alignment path, the third visible reference line being adapted for forming a minimum and a maximum desired parking distance of the delivery vehicle within the alignment path relative to the centerline of the loading ramp.

* * * * *